No. 617,437. Patented Jan. 10, 1899.
H. COCHRAN.
STOP VALVE.
(Application filed Nov. 19, 1897.)
(No Model.)

WITNESSES:
M. R. Raymond.
C. L. Raymond.

INVENTOR
Heywood Cochran
BY
Ward Raymond
ATTORNEY.

UNITED STATES PATENT OFFICE.

HEYWOOD COCHRAN, OF JOHNSTOWN, PENNSYLVANIA.

STOP-VALVE.

SPECIFICATION forming part of Letters Patent No. 617,437, dated January 10, 1899.

Application filed November 19, 1897. Serial No. 659,078. (No model.)

*To all whom it may concern:*

Be it known that I, HEYWOOD COCHRAN, of Johnstown, county of Cambria, State of Pennsylvania, have invented certain new and useful Improvements in Stop-Valves, of which the following specification is a true and exact description, due reference being had to the accompanying drawings.

My invention specially relates to that class of valves used in a pipe system to cut off and close one portion of the system from the rest.

The object of my invention is to provide a valve having certain new and useful features, as will be hereinafter described and claimed.

While the valve embodying my invention may be employed in a variety of ways and in systems for the distribution of water, gas, steam, or like uses, I will describe it as employed in a refrigerating system.

Figure 1:
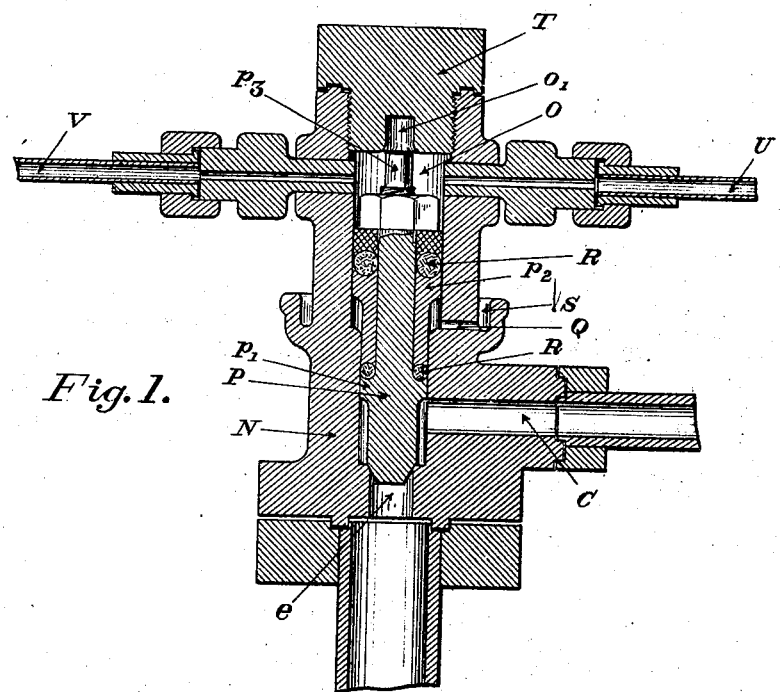
Figure 2:
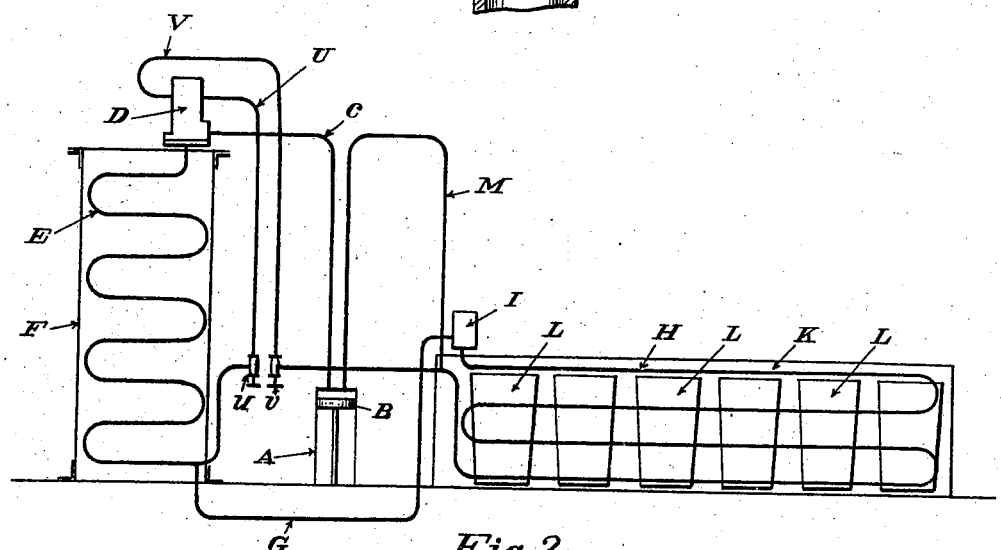

Referring to the drawings, Figure 1 represents a sectional view of a valve embodying my invention. Fig. 2 is a diagrammatic view of an ice-making plant, showing a valve constructed in accordance with my invention and the piping accompanying the same.

In Fig. 2, A is the cylinder of the gas-compressor, and B the piston in the same. C is the discharge-pipe from the compressor, leading to valve D, which valve embodies my invention. From this valve D leads the condenser-coil E in tank F. From the bottom of coil E is the liquid-pipe G for supplying refrigerating-coil H through regulating-valve I. The coil H is submerged in the brine-tank K, in which are placed the ice-cans L in the usual manner. The other end of coil H is connected, through pipe M, to the suction side of compressor A. This is the customary manner of arranging a plant of this kind.

When the compressor is stopped for any length of time, it is customary to close the valves D and I in order to bottle up the high-pressure liquid and gas in the condenser-coil E to prevent any possible loss through leaks in the rest of the system. Usually valve D is the regular plug-valve closed by screwing the stem down upon the seat, and this when closed is absolutely fixed in its position, and, moreover, it must be operated by hand, to do which the operator must go to it be it where it may. Should the compressor start up when this valve was closed through oversight, it would compress the gas into the small discharge-pipe C, in which consequently the pressure would rapidly rise until either the pipe or compressor failed and an accident more or less serious would result.

To provide a valve which may be operated from a distance and also insures against a dangerous pressure in the system should the compressor be started while the valve is closed is the object of my invention.

Referring to Fig. 1, N is the body of the valve, C the connection to the discharge-pipe c from the compressor, and e the connection to the condenser-coil E.

Within the body N and adapted to reciprocate in the suitably-formed chamber O is the piston valve-stem P, which is adapted to engage the mouth of connection e and close it and by withdrawing open it. This valve-stem P has in effect two pistons formed upon it, the one, $p'$, of one diameter, and the other, $p^2$, of greater diameter, each fitting a portion of the chamber O of the same diameter and suitably packed against the leakage of gas by the packings R. The intermediate portion of the chamber O between the pistons is open through vent Q into the surrounding pocket S. This pocket may be kept filled with water, oil, glycerin, or any suitable liquid, through which any gas passing either of the pistons must find its way and be apparent by the bubbles it causes. The plug T closes the end of the chamber O, and in it may be found the cavity O', adapted to receive the stud $p^3$ on stem P and act as a dash-pot to check the motion of the stem P. Into the space above the large piston $p^2$ lead the ducts U and V. These in Fig. 2 in turn are connected with the high-pressure-liquid pipe and the low-pressure return-pipe M through plain stop-valves $u$ and $v$.

The manner of operating the valve D is as follows: To close it, the valve $u$ is opened, thereby admitting the high-pressure gas into chamber O, so as to act upon piston $p^2$, and thereby forcing it down upon the seat, closing orifice e. To open it, valve $u$ is closed and $v$ opened. This allows the high-pressure gas contained in chamber O above piston $p^2$ to escape into the low-pressure side of the system, thereby reducing the pressure upon piston $p^2$. The high condenser-pressure and that in the discharge-pipe C, acting upon piston $p'$, is sufficient to overcome the low pressure upon piston $p^2$, and therefore the valve is raised and opened. The areas of the two pistons should be so proportioned to the working pressure that this result will be obtained. Now should the compressor for any reason be started while the high-pressure valve $u$ was open and the valve consequently down, the result would be that the pressure would at once rise in pipe $c$, as was the case when the usual hand-valve was employed. Instead, however, of increasing until something failed, it would only rise to that point where it balanced the pressure upon piston $p^2$. Any further increase would open the valve and allow the gas to flow into condenser E and the pressure to fall.

The areas of the two pistons may be so proportioned as to open the valve at any predetermined rise of pressure in pipe $c$ over that in the condenser.

While I have shown the low-pressure pipe V as returning the gas to the suction side of the system, it will be understood that this is done for the purpose of saving the gas in the pipe V, which would otherwise be wasted. Were the valve used on a system for steam, air, or other agent where this saving would not be considered, the two valves $u$ and $v$ might be combined into one three-way valve or any like arrangement for saving piping, as will be readily understood, the steam or air being allowed to escape into the atmosphere.

The object of the pipe V and the valve $v$ is only to relieve the piston $p^2$ of sufficient pressure to allow the high pressure beneath piston $p'$ to force it upward.

As before stated, the controlling-valves $u$ and $v$ may be placed wherever convenient, and emergency-valves may be placed in points of safety, from which points the main valves may be closed. In the case of an ammonia refrigerating plant this is a valuable feature, as it sometimes happens in the case of a break in the pipes that the whole charge of ammonia escapes on account of the stop-valves being so placed as to be unapproachable on account of the gas-fumes.

In the claims I have, for convenience, considered the chamber O as two chambers, one for each piston; but it will be understood that they may be combined, as shown.

Having thus described my invention, what I claim, and desire to protect by Letters Patent, is—

1. A pipe-valve comprising a body, a chamber in said body and in connection with the inlet and outlet orifices of the valve, a piston in said chamber and having a valve-stem adapted to close the outlet-orifice, the piston being so arranged that the pressure from the inlet is constantly exerted upon it to open the valve, a second piston of larger area than the first and in a second chamber, means for admitting pressure from the system upon the last-mentioned piston to cause it to close the valve and means for varying the pressure.

2. In a valve, in combination with the body, a pair of chambers therein, one of greater area than the other, a pair of connected pistons each fitting one of the chambers and adapted to reciprocate therein, a valve-stem operated by said pistons, means for applying a constant pressure from the system to one of the pistons and means for applying a variable pressure to the other.

In testimony whereof I have affixed my signature in presence of two witnesses.

HEYWOOD COCHRAN.

Witnesses:
  WARD RAYMOND,
  DANL. W. PATTERSON.